(12) United States Patent
Oh et al.

(10) Patent No.: US 6,445,418 B1
(45) Date of Patent: Sep. 3, 2002

(54) VIDEO CODING AND DECODING METHOD

(75) Inventors: Byong Khi Oh, Seoul; Byoung Ok Lee, Kyonggi-do, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/349,496

(22) Filed: Jul. 9, 1999

(30) Foreign Application Priority Data

Jul. 10, 1998 (KR) .............................. 98-27810
Dec. 4, 1998 (KR) .............................. 98-53043

(51) Int. Cl.[7] ................................. H04N 7/18
(52) U.S. Cl. ................................. 348/390; 375/240.01
(58) Field of Search ........................ 375/240.01–240.07

(56) References Cited

U.S. PATENT DOCUMENTS

| | | | | |
|---|---|---|---|---|
| 5,930,398 A | * | 7/1999 | Watney | 382/239 |
| 5,990,955 A | * | 11/1999 | Koz | 375/240.18 |
| 6,233,282 B1 | * | 5/2001 | Guerrera | 375/240.25 |

* cited by examiner

*Primary Examiner*—Andy Rao
(74) *Attorney, Agent, or Firm*—Birch, Stewart, Kolasch & Birch, LLP

(57) ABSTRACT

The present invention relates to a video coding and decoding method for an image communication system. Particularly, the present invention relates to a video coding and decoding method for setting a reference compression ratio for prevention of degradation of picture quality during video reconstruction, compressing a present image with change of the compression ratio in accordance with a transmission rate, comparing the compression ratio of the present compressed image with the reference compression ratio, controlling a compensation value of a video signal obtained before the compression to lower complexity of the video signal if the compression ratio of the present compressed image exceeds the reference compression ratio, and applying the compression ratio to the compensation value controlled image in coding video signals in an image communication system, thereby minimizing the degradation of transmitting image quality and increasing transmission efficiency.

Furthermore, the present invention generates information indicating the content of compensation that has been performed with respect to the video signal to decrease a complexity of the video signal during the coding.

21 Claims, 5 Drawing Sheets

VIDEO CODING AND DECODING METHOD

BACKGROUND OF THE INVENTION

1. Field of the Invention

The present invention relates to a video coding and decoding method for an image communication system. Particularly, the present invention relates to a video coding and decoding method for setting a reference compression ratio for prevention of degradation of picture quality during video reconstruction, compressing a present image with change of the compression ratio in accordance with a transmission rate, comparing the compression ratio of the present compressed image with the reference compression ratio, controlling a compensation value of a video signal obtained before the compression to lower complexity of the video signal if the compression ratio of the present compressed image exceeds the reference compression ratio, and applying the compression ratio to the compensation value controlled image in coding video signals in an image communication system, thereby minimizing the degradation of transmitting image quality and increasing transmission efficiency.

2. Description of Related Art

FIG. 1 schematically illustrates a configuration of an image communication system according to a related art.

The image communication system allows the image and voice of a caller to be simultaneously transmitted through communication lines including cables, such as PSTN (Public Switched Telephone Network), dedicated lines and optical cable, and/or wireless networks.

Such image communication system comprises: a charge coupled device (CCD) 1 for converting images incoming through a lens 1a for taking a photograph into electronic video signals; a CCD driver 2 for driving the CCD 1 and processing the electronic video signals received from the CCD 1 to provide outputs; a digital signal processor 3 for digital signal processing the video signals output from the CCD driver 2 to output the signals through a monitor 4 and, simultaneously, transforming the video signals into a specified format (CCIR656 format) of luminance signals (Y) and color signals (Cb, Cr) for video compression; a video compression/reconstruction unit 5 for performing compression or reconstruction of the video signals incoming through the CCD 1 or transmission lines; a communication control and interface unit 6 for transmitting the compressed video signals or receiving video signals transmitted from another image communication system of the other party; and a controller 7 for controlling the overall circuit for the video signal processing, compression/reconstruction, and transmission.

The following description concerns the operation of the image communication system having such configuration.

Primarily, an image received through the lens 1a is converted into an electronic video signal in the CCD 1 and then input into the CCD driver 2.

The CCD driver 2 then performs analog signal compensation with respect to the input video signal to provide a signal of a predetermined level to the digital signal processor 3.

Subsequently, the digital signal processor 3 performs clamp, RGB color control, and brightness control with respect to the input video signal to display the photographed image through the monitor 4.

At this time, the digital signal processor 3 transforms a luminance signal Y and a color signal Cb and Cr into a specified format for compression of transmitting image and provides the transformed signal to the video compression/reconstruction unit 5.

Thereafter, the video compression/reconstruction unit 5 compresses the video signal received from the digital signal processor 3 according to JPEG (Joint Photographic Coding Experts Group) or MPEG (Moving Picture Experts Group). The compressed video signal is transmitted via the communication control and interface unit 6 over a communication line to another image communication system of the other party.

Alternatively, a video signal received via the communication control and interface unit 6 from the image communication system of the other party is respectively reconstructed and signal processed in the video compression/reconstruction unit 5 and the digital signal processor 3 and then displayed through the monitor 4.

Such signal processing is controlled by the controller 7.

This image communication system basically has a function of controlling a compression ratio of the photographed video signal to comport with a video data transmission rate which means the number of image frames per unit time (frames/second) required for the video transmission.

Techniques for video compression and transmission have usually been standardized. JPEG for still picture compression and MPEG for moving picture compression are typical image compression methods. These compression techniques use a quantization table.

However, in case of compressing an image using the quantization table, the file size of compressed video data becomes larger as the image gets more complicated, so the video data transmission is time-delayed and the number of image frames which can be transmitted for the unit time decreases.

Consequently, the quantization table should be controlled to increase the compression ratio and decrease the file size before the transmission for the purpose of satisfying the required number of image frames per unit time.

However, when such compressed file is reconstructed in the other party's system, an image of much degraded picture quality is displayed due to damage on the contour of the image (that is, an edge is not displayed in good order), block effect, or loss of reconstructed data which may be caused by over compression of the source image.

Briefly, the amount of data of a video signal to be compressed increases as the complexity of transmitting image gets larger. If the compression ratio is increased to deal with the large amount of data, the resultant compressed video signal is reconstructed to an image of degraded picture quality.

Particularly, in case of employing the NTSC (National Television System Committee) mode, several frames to 30 frames should be transmitted for a second. In this occasion, increase of compression ratio for a complex image may lead to a result quite different from a source image.

Besides, the conventional techniques perform contour compensation emphasizing edge components (high frequency components) of an image before compressing the image, so the contour compensated image is compressed, decreasing compression efficiency.

SUMMARY OF THE INVENTION

Accordingly, the present invention is directed to a video coding and decoding method for an image communication system that substantially obviates one or more of the limitations and disadvantages of the related art.

An objective of the present invention is to provide a video coding method for setting a reference compression ratio available for minimizing picture degradation, comparing a compression ratio of a present compressed image with the set reference compression ratio, and decreasing a complexity of a source image to control the present compression ratio to be smaller than the reference compression ratio if the present compression ratio exceeds the reference compression ratio in an image communication system, thereby minimizing degradation of picture quality when the image is received and reconstructed by another system.

Another objective of the present invention is to provide a video coding method for setting a video data transmission rate of a transmission line and a reference compression ratio for minimizing picture degradation, compressing a present image according to the transmission rate, comparing a present compression ratio of the compressed image with the reference compression ratio, and decreasing a complexity of a source image obtained before the compression to control the present compression ratio to be smaller than the reference compression ratio if the present compression ratio of the compressed image exceeds the reference compression ratio in an image communication system, thereby minimizing degradation of picture quality when the image is received and reconstructed by another system.

Still another objective of the present invention is to provide a video coding and decoding method for controlling video compensation values of a luminance signal and/or color signal to lower a complexity of a source image and transmitting an overhead containing data of controlled values together with the image so as to allow a system receiving and reconstructing the image to perform signal processing corresponding to the video compensation performed by a transmitting party, thereby minimizing degradation of picture quality of the transmitting image and increasing transmission efficiency.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a video coding method for image communication, comprises: the communication limit condition setting step of setting a specified reference compression ratio for minimizing degradation of picture quality which may occur during reconstruction; the video compressing step of compressing a present image changing a compression ratio according to a transmission rate; the step of comparing a present compression ratio of the compressed image with the set reference compression ratio; and the step of performing compensation value control with respect to an image obtained before the compression to lower a complexity of the image if the present compression ratio of the compressed image is larger than the reference compression ratio and performing the above compression with respect to the compensation value controlled image.

Overhead information indicating a content on compensation of the video signal is generated and transmitted with the compressed video signal.

The overhead information indicates whether or not contour compensation of the image was performed and which of emphasizing and attenuating compensations was performed if the contour compensation was performed.

The video signal compensation value control is performed such that at least one of a horizontal/vertical contour compensation value, a low luminance compensation value, a processing reference value of low data in case of data coring compensation and the amount of attenuation of a color value in case of chroma suppress compensation is controlled.

In another aspect, the present invention provides a video decoding method of an image communication system, comprising: the overhead reading step of detecting from a received data bitstream, information indicating whether or not contour compensation was performed and which of emphasizing and attenuating compensations was performed; the contour compensation step of performing the contour compensation with respect to the received video data if it is determined that the received video data was not contour-compensated or the attenuating compensation was performed with respect to the received video data according to a result of the overhead reading step; and the step of reconstructing the received video data as it is without performing the compensation if it is determined that the contour emphasizing compensation was performed with respect to the received data according to the result of the overhead reading.

The present invention previously sets a compression ratio as a communication limit condition to minimize degradation of picture quality that may occur during the reconstruction.

At this time, a maximum data size of one frame in accordance with the video transmission rate (frame/second) of a transmission line is also set.

In the conventional art, a source image is so compressed as to comport with the video transmission rate, namely, the maximum data size of one frame that is set in accordance with the video transmission rate. If a size of the compressed video data exceeds the maximum data size, a quantization table value is controlled to increase the compression ratio, thus satisfying the condition of transmission rate. Finally, the compressed image is transmitted. However, if the source image is over compressed at the increased compression ratio, the picture quality is degraded when the image is reconstructed. The present invention decreases a complexity of the source image instead of increasing the compression ratio to minimize the degradation of picture quality.

In other words, a compression ratio available for minimizing the picture quality degradation is set as a reference compression ratio for the communication limit condition.

Thereafter, the source image is compressed in accordance with the transmission rate. If the compression ratio of the compressed image exceeds the reference compression ratio, it can be estimated that the degradation of picture quality will occur. In this occasion, luminance and color signals of the source image are properly compensated to decrease the complexity of the source image. The image whose complexity was decreased is compressed in accordance with the transmission rate.

The image whose complexity was decreased is a little different from the source image, but the operation for decreasing the complexity of the source image does not influence the entire picture quality. Therefore, when the video signal whose complexity was decreased is compressed, the compression ratio falls within the range smaller than the reference compression ratio. Since the video signal is compressed at the available compression ratio considering the degradation of picture quality, the degradation of picture quality caused by over compression can be prevented when this video signal is received and reconstructed.

The operation of lowering the complexity of the source image is usually achieved by proper control of a compensation value in a luminance signal processing step or a color signal processing step carried out at a digital signal processor.

Specifically, in the luminance signal processing step, the compensation of horizontal or vertical contour of a source image is achieved by controlling contour compensation data, thereby lowering the complexity of the source image.

In the luminance signal processing step, the compensation of low luminance signal of the source image is achieved by controlling a corresponding compensation value, thereby lowering the complexity of the source image.

In the luminance signal processing step, data coring is achieved by controlling a coring reference value, thereby lowering the complexity of the source image.

Additionally, in the color signal processing step, chroma suppress is achieved by controlling the size of color data, thereby lowering the complexity of the source image.

Meanwhile, during the video compensation for lowering the complexity of the source image in coding the image, information indicating whether or not the contour compensation is carried out or whether or not attenuating compensation is carried out is generated as an overhead and transmitted with a video data bitstream. The receiving party detects the overhead and performs an operation corresponding to the process performed by the transmitting party.

Typically, the contour of an image contains a lot of edge components. To compress the edge components (high frequency components), a high compression ratio is required. This causes the degradation of picture quality and the decrease of transmission efficiency. Therefore, the transmitting party compresses and transmits the source image without performing the contour compensation and then the receiving party performs the contour compensation when reconstructing the source image, using the overhead indicating the fact that the contour compensation was not performed in the transmitting party.

Alternatively, if the transmitting party performs the contour compensation, information indicating that the compensation is emphasizing compensation or attenuating compensation is generated as the overhead and transmitted to the receiving party. The receiving party then reconstructs the source image as it is if it is determined that the contour compensation is the emphasizing compensation and performs the emphasizing compensation if it is determined that the contour compensation is the attenuating compensation, thereby minimizing the degradation of picture quality of the source image and increasing data transmission efficiency.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENTS

Video signal coding and decoding methods according to the present invention will now be described in more detail with reference to the accompanying drawings FIG. 2 through FIG. 6.

Figure 1:
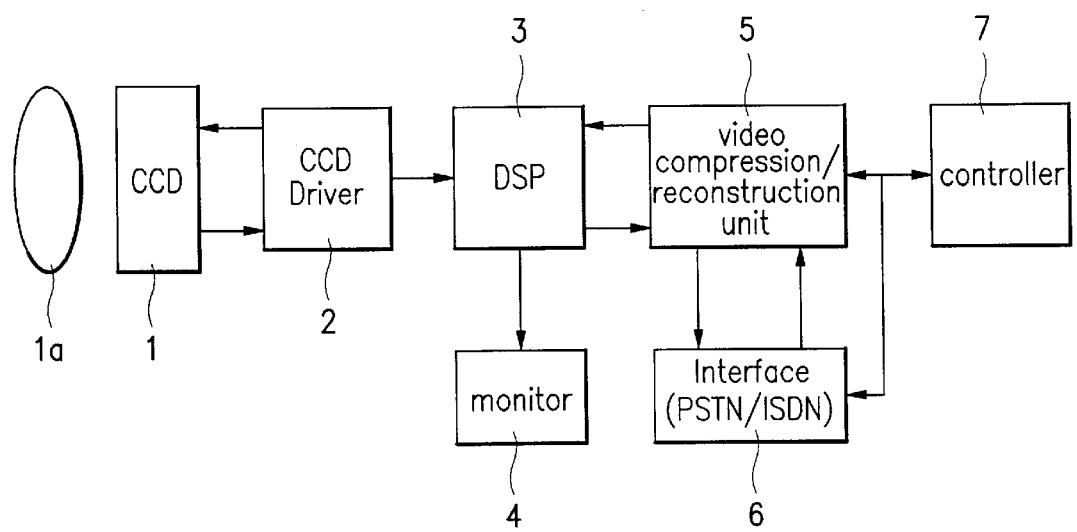
FIG. 1 is a schematic block diagram of an image communication system.
Figure 2:
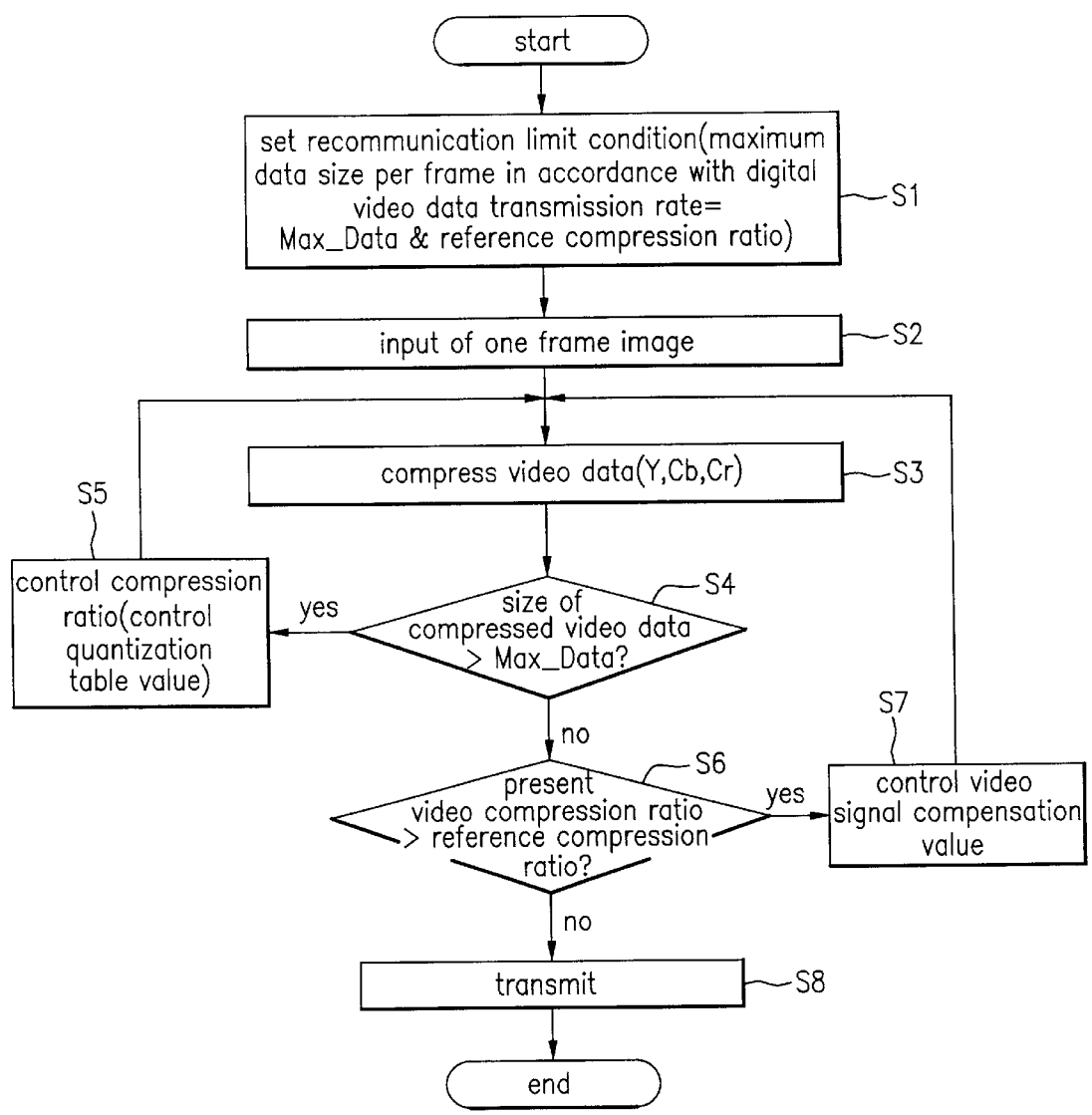
FIG. 2 is a flow chart of video coding according to an embodiment of the present invention.

FIG. 2 is a flow chart showing a video coding method according to the present invention. The video coding method of the present invention comprises the steps of: setting, as a limit condition of image communication, a maximum data size Max_Data per frame in accordance with a video transmission rate and a reference compression ratio available for minimizing degradation of picture quality during image reconstruction; compressing a present image and comparing a data size of the present compressed video data with the set maximum data size Max_Data; performing the compression changing the compression ratio of the source image until the size of the present compressed video data is smaller than the set maximum data size Max_Data if the size of the present compressed video data is larger than the maximum data size Max_Data; comparing a-compression ratio of the present compressed image with the set reference compression ratio if the size of the present compressed video data is smaller than the maximum data size Max_Data; compensating the present image to lower its complexity and repeating the above steps starting from the compression step if the present compression ratio is larger than the reference compression ratio; and transmitting the present compressed image if the present compression ratio is smaller than the reference compression ratio. These steps may be performed by the image communication system shown in FIG. 1.

With reference to FIG. 1 and FIG. 2, the video coding method according to the present invention will be described in detail.

The controller 7 sets in Step S1 the maximum data size Max_Data per frame based upon the number of frames that can be transmitted for a second and the reference compression ratio, namely a reference quantization value, preventing degradation of picture quality during reconstruction after transmitted and received by another system.

The reference quantization value is used as reference data for determining a compression ratio of video data.

Thereafter, if one frame image is received from the digital signal processor 3 in Step S2, the video compression/reconstruction unit 5 compresses in Step S3 the input video based upon a given quantization table.

After the video compression, the controller 7 in Step S4 compares the size of compressed video data with the maximum data size Max_Data that is set in accordance with a communication limit. condition to determine whether or not the compressed image satisfies the communication limit condition.

If the size of the compressed video data is larger than the available maximum video data size Max_Data, the quantization table value (compression ratio) is controlled and the source image is compressed according to the controlled value in Step S5, thereby allowing the size of the compressed video data to satisfy the available maximum video data, namely, the communication limit condition (video transmission rate). After Step S5, the process returns to Step S3.

After compressing the image in accordance with the communication limit condition (video transmission rate), the compression ratio of the compressed video data is compared with the reference compression ratio available for minimizing the degradation of picture quality in Step S6.

The reference compression ratio is set as a maximum compression volume for preventing the degradation of picture quality which may be caused by over-compression during the reconstruction. The controller 7 changes the source image in Step S7 or transmits it in Step S8 as it is according to the result of the comparison between the reference. compression ratio and the present compression ratio of the compressed image.

In other words, if the present video compression ratio is larger than the reference compression ratio, control for decreasing the complexity of the source image obtained before compression (that is, control of video signal com pensation value) is carried out in Step 7 and the process returns to Step S3.

Figure 3:
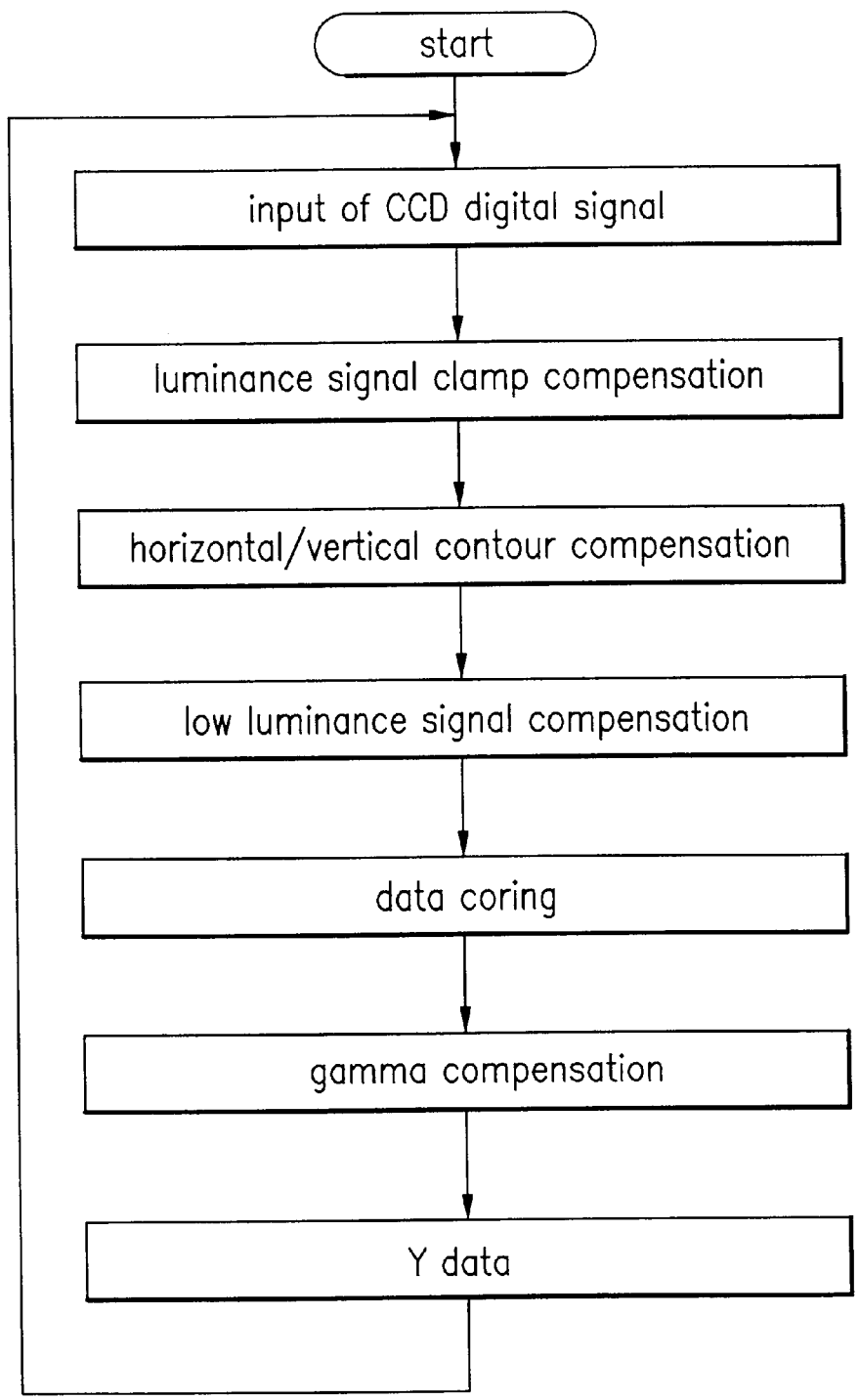
FIG. 3 is a flow chart showing how a luminance signal is processed for control of a video signal compensation value during the video coding according to an embodiment of the present invention.
Figure 4:
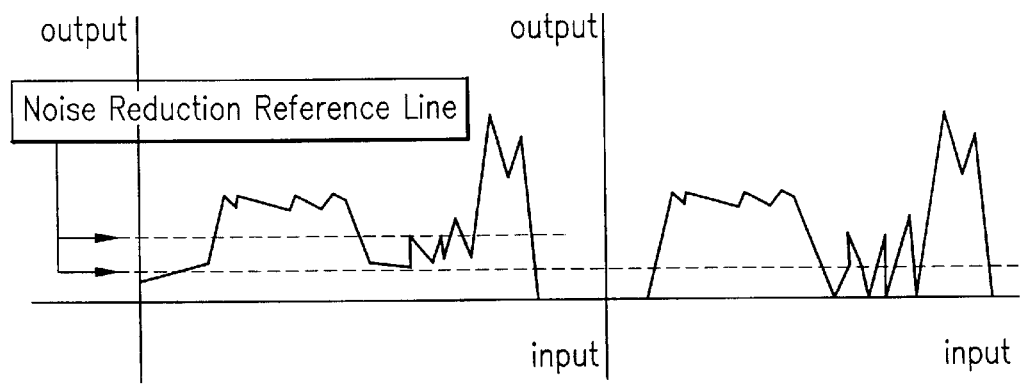
FIG. 4 is a diagram for explaining data coring for control of a video signal compensation value during the video coding according to the present invention.
Figure 5:
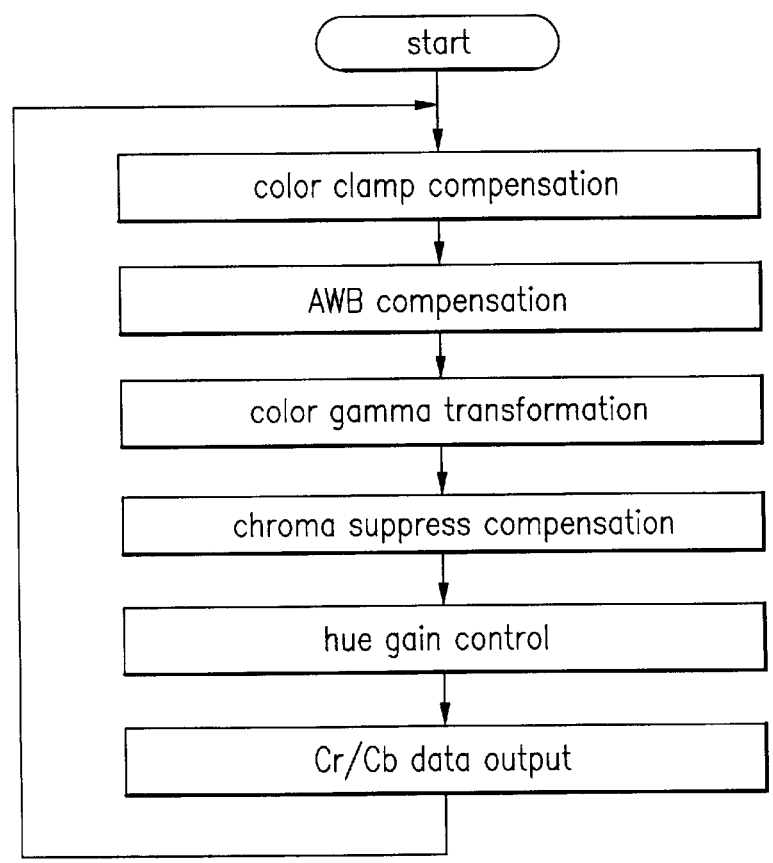
FIG. 5 is a flow chart showing how a color signal is processed for control of a video signal compensation value during the video coding according to an embodiment of the present invention.

Referring to FIG. 3 to FIG. 5, the control of video signal compensation value will be described according to an embodiment of the present invention.

The video signal compensation value control comprises luminance signal processing (FIG. 3) and color signal processing (FIG. 5). Referring to FIG. 3, the luminance signal processing is first described.

Primarily, the digital signal processor 3 performs signal processing with respect to an image photographed by the CCD 1 to transform the image into a specified format (CCIR655 format) and then provides luminance signal (Y) and color signal (Cb, Cr) transaction data to the video compression/reconstruction unit 5.

Particularly, the video compression/reconstruction unit 5 performs luminance signal clamp compensation in response to the CCD digital video signal, namely, the luminance signal (Y) and color signal (Cb, Cr) transaction data.

During the luminance signal clamp compensation, a value of luminance level of the CCD 1 is controlled referring to dark cell data which is a reference of darkness in accordance with the characteristic of the CCD 1.

Subsequently, horizontal/vertical contour control/compensation is carried out.

The horizontal/vertical contour control is such that data of a contour part is extracted and the contour is made to be clear. Assuming that Z0 indicates present video data, Z1 indicates data obtained before a first step, and. Z2 indicates data obtained before a second step in a typical compensation method, horizontal/vertical contour compensation data is expressed as the following formula 1.

$$Z1 - \frac{Z0 + Z2}{2} \qquad \text{[Formula 1]}$$

For the purpose of lowering the complexity of the source image obtained before the compression, the contour compensation data is controlled such that a gain G based upon the compression ratio is applied to such contour compensation data as represented by the formula 1 (compensation data*G).

At this time, the gain G is controlled within the range from 1/n to 1 (n is a positive integer) based upon the compression ratio. If the amount of data to be compressed exceeds the set reference compression ratio, the gain of the compensation data is decreased. If the amount of data to be compressed is smaller than the set reference compression ratio, the gain is increased.

Thereafter, low luminance signal compensation is carried out.

The low luminance signal compensation is a method of compensating a low data value of low luminance. Since an image does not clearly appear when a picture is dark, a compensation value gets larger as the luminance is low.

As aforementioned, the low luminance compensation value is decreased if the present compression ratio is larger than the set reference compression ratio, and the low luminance compensation value is increased if the present compression ratio is smaller than the reference compression ratio during the video signal compensation value control step, thereby lowering the complexity of the source image.

Subsequently, data coring is carried out.

The data coring is a method of removing data having a low level value. The control is. performed in different stages defined by low illumination/high luminance.

In other words, the data having a low level value (low illumination) is set at "0" as shown in FIG. 4. To lower the complexity of the video signal, a noise reduction reference line is controlled based upon the compression ratio. If the present compression ratio of the compressed image exceeds the set reference compression ratio, a size of compensated data is reduced, and if the present compression ratio of the compressed image is smaller than the set reference compression ratio, the size of the compensated data is increased, thereby controlling the complexity of the source image.

Following the luminance signal processing (for the video signal compensation), gamma compensation of transforming the data to make the data comport with display characteristics of the monitor is carried out, thus generating luminance signal (Y) data.

As shown in FIG. 5, the color signal processing comprises: the color clamp compensation step of regularly compensating a level of the color signal; the automatic white balance (AWB) compensation step of controlling RGB components received by the CCD 1 to make these components similar to natural colors (primary colors); the color gamma transformation step of replacing data to make the data comport with color brightness of the monitor; the chroma suppress compensation step of decreasing a size of color data depending on a size of luminance contour and a low illumination; and the hue/gain control step of controlling sizes and phases of color components of the color signal (Cb, Cr).

During the color signal processing step of the video signal compensation value control, if the present compression ratio of the compressed image exceeds the reference compression ratio, the amount of attenuation during the chroma suppress becomes larger and if the present compression ratio of the compressed image is smaller than the reference compression ratio, the amount of the attenuation during the chroma suppress becomes smaller, thereby lowering the complexity of the source image.

As illustrated, the compression ratio of the re-compressed video data is so controlled as to satisfy the communication limit condition by controlling the video signal compensation value to decrease the complexity of the source image.

In addition, overhead information indicating the change of the compensation value of the source video signal obtained before the compression is generated by the controller 7 and embedded into a video data bitstream that is finally transmitted. A decoding system receives this bitstream and reversely performs the procedure performed by the coding system to reconstruct the source image.

The overhead information indicates whether or not the contour compensation was carried out.

Additionally, the overhead information also contains information indicating one of attenuating compensation and emphasizing compensation if the contour compensation was carried out.

Figure 6:
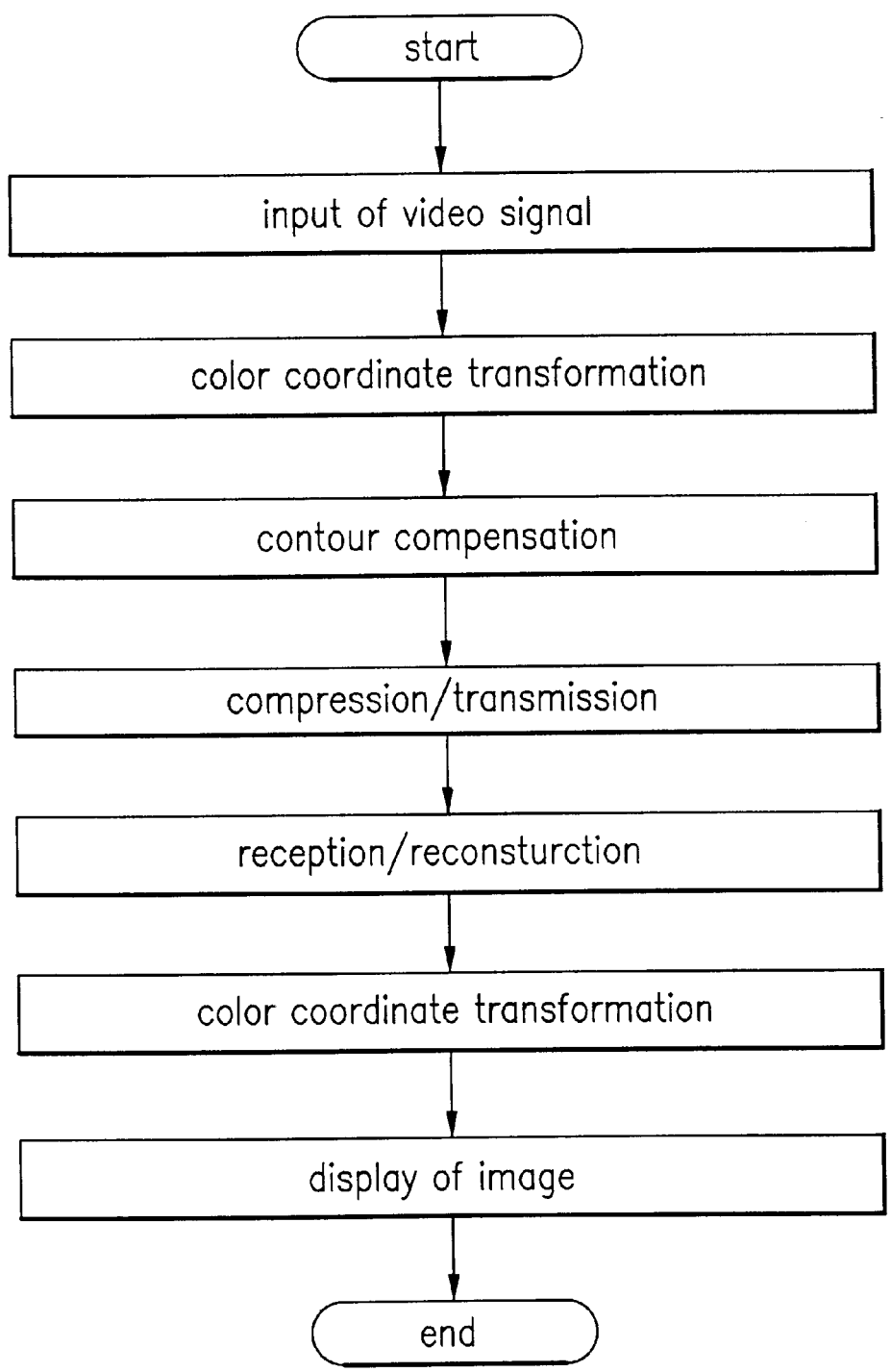
FIG. 6 is a flow chart of video signal decoding according an embodiment of to the present invention.

FIG. 6 shows steps of a video signal coding and decoding method in order according to an embodiment of the present invention. The decoding method may be carried out in the image communication system shown in FIG. 1.

In the video signal compression step, once a video signal to be compressed is received, RGB video signals are color coordinate transformed into Y/Cb/Cr signals and the transformed Y/Cb/Cr video signals are compressed to be stored in a memory (or transmitted).

At this time, setting of the communication limit condition and the control based upon the video transmission rate comporting with the communication limit condition and the reference compression ratio are performed as shown in FIG. 2 to FIG. 5. The information indicating whether or not the image contour compensation was performed and/or the emphasizing or attenuating compensation is transmitted as an overhead along with the video signal.

In a video signal reconstructing step, a data bitstream containing the compressed video data is received and reconstructed. After checking the overhead, if it is determined that the contour compensation was not carried out, the contour compensation (which improves resolution by emphasizing an edge component of the image) is performed with respect to reconstructed Y/Cb/Cr signals. The contour compensated Y/Cb/Cr video signals are color coordinate transformed into RGB signals and then displayed as an image on the screen of a cathode ray tube (CRT) or liquid crystal device (LCD).

Alternatively, if it is determined that the contour compensation was carried out during the coding, source image data is reconstructed and displayed as it is in case of the emphasizing compensation and an image which has been properly processed by the emphasizing compensation depending on the amount of attenuation is displayed on the screen in case of the attenuating compensation.

The present invention compresses a source image such that a present compression ratio is within a limit of a reference compression ratio available for minimizing degradation of picture quality which may occur when the source image is reconstructed and that a transmission rate is also considered, thereby ensuring good quality of a received image.

Furthermore, since the present invention performs the compression according to the method allowing decrease of complexity of a source image. to comport with a predetermined reference compression ratio for minimizing the degradation of picture quality, the compensation value control over the source image can be performed within a minimum range in which the source image is not damaged and the picture quality degradation can be minimized when the compressed source image is received and reconstructed can be made in a video coding and decoding method for an image communication system of the present invention without deviating from the spirit or scope of the invention. Thus, it is intended that the present invention covers the modifications and variations of this invention provided they come within the scope of the appended claims and their equivalents.

What is claimed is:

1. A video coding method for image communication, comprising:
   a communication limit condition setting step of setting a specified reference compression ratio;
   a video compressing step of compressing a present image changing a compression ratio according to a transmission rate;
   a step of comparing a present compression ratio of the compressed image with the reference compression ratio; and
   a step of performing a video signal compensation value control with respect to an image obtained before the compression to lower a complexity of the image if the present compression ratio of the compressed image is larger than the reference compression ratio and performing the above compression with respect to the compensation value controlled image,
   wherein said video signal compensation value control is achieved by a luminance signal processing operation,
   said luminance signal processing operation including,
      a luminance signal clamp compensation step of compensating a value of luminance level of an incoming CCD (charge coupled device) digital video signal;
      a horizontal/vertical contour compensation step of extracting data of a contour part from the compensated video signal and compensating the horizontal/vertical contour; and
      a low luminance signal compensation step of compensating the horizontal/vertical contour compensated video signal for a low data value of low luminance.

2. The method as claimed in claim 1, wherein said video signal compensation value control is performed such that at least one of a horizontal/vertical contour compensation value, a low luminance compensation value, a processing reference value of low data in case of data coring compensation and the amount of attenuation of a color value in case of chroma suppress compensation is controlled.

3. The method as claimed in claim 1, wherein said video signal compensation value control is achieved by a color signal processing operation.

4. The method as claimed in claim 1, wherein said luminance signal processing operation further comprises:
   a data coring step of removing data of a low level from the low luminance compensated video signal based upon low illumination/high luminance; and
   a gamma compensation step of transforming the data from which the low level data is removed so as to make the data comport with display characteristics and providing luminance signal (Y) data.

5. The method as claimed in claim 4, wherein said low luminance signal compensation step comprises the steps of: decreasing the low luminance compensation value if the present compression ratio is larger than the set reference compression ratio; and increasing the low luminance compensation value if the present compression ratio is smaller than the set reference compression value.

6. The method as claimed in claim 4, wherein said data coring step comprises the step of controlling a noise reduction reference line in accordance with the compression ratio to decrease a size of the compensated data if the present compression ratio is larger than the set reference compression ratio and to increase a size of the compensated data if the present compression ratio is smaller than the set reference compression ratio.

7. A video coding method for image communication, comprising:
   a communication limit condition setting step of setting a specified reference compression ratio;
   a video compressing step of compressing a present image changing a compression ratio according to a transmission rate;
   a step of comparing a present compression ratio of the compressed image with the set reference compression ratio; and
   a step of performing compensation value control with respect to an image obtained before the compression to lower a complexity of the image if the present compression ratio of the compressed image is larger than the reference compression ratio and performing the above compression with respect to the compensation value controlled image,
   wherein said compensation valve control is achieved by a color signal processing operation including,
      a color clamp compensation step of compensating a level of the color signal;
      an automatic white balance control step of automatically controlling RGB components of the compensated color signal;
      a color gamma transformation step of replacing data to make the RGB controlled video signal comport with color brightness of a display device; and
      a chroma suppress compensation step of decreasing a size of the replaced color data depending on a size of luminance contour and a low illumination.

8. The method as claimed in claim 7, wherein said chroma suppress compensation step comprises the step of: increasing the amount of attenuation of chroma suppress if the present compression ratio is larger than the reference compression ratio; and decreasing the amount of the attenuation of chroma suppress if the present compression ratio is smaller than the reference compression ratio.

9. The method as claimed in claim 1, wherein overhead information indicating a content on compensation of the video signal is generated during the video signal compensation and embedded into a compressed video data bitstream.

10. The method as claimed in claim 9, wherein said overhead information indicates whether or not contour compensation of the image was performed and which of emphasizing and attenuating compensations was performed when the contour compensation was performed.

11. A video coding method for an image communication system, the method comprising the steps of:
   setting, as a limit condition of image communication, a maximum data size (Max_Data) per frame in accordance with a video transmission rate and a reference compression ratio available;
   compressing a present image and comparing a data size of the compressed video data with the set maximum data size;
   performing compression changing the compression ratio of a source image until the size of the present compressed video data is smaller than the set maximum data size if the size of the present compressed video data is larger than the maximum data size;
   comparing a present compression ratio of the compressed image with the set reference compression ratio if the data size of the present compressed image is smaller than the maximum data size;
   compensating the present image to lower its complexity and repeating the above steps starting from the compression step if the present compression ratio is larger than the reference compression ratio; and
   transmitting the present compressed image if the present compression ratio is smaller than the reference compression ratio,
   wherein the present image is compensated by performing a luminance signal process operation,
   said luminance signal processing operation including,
      a luminance signal clamp compensation step of compensating a value of luminance level of an incoming CCD (charge coupled device) digital video signal;
      a horizontal/vertical contour compensation step of extracting data of a contour part from the compensated video signal and compensating the horizontal/vertical contour; and
      a low luminance signal compensation step of compensating the horizontal/vertical contour compensated video signal for a low data value of low luminance.

12. A video decoding method for an image communication system, the method comprising:
   an overhead reading step of detecting from a received data bitstream, information indicating whether or not contour compensation was performed and which of emphasizing and attenuating compensations was performed, wherein the compensations include a luminance signal processing operation having,
      a luminance signal clamp compensation- step of compensating a value of luminance. level of an incoming CCD (charge coupled device) digital video signal;
      a horizontal/vertical contour compensation step of extracting data of a contour part from the compensated video signal and compensating the horizontal/vertical contour; and
      a low luminance signal compensation step of compensating the horizontal/vertical contour compensated video signal for a low data value of low luminance;
   a contour compensation step of performing the contour compensation with respect to the received video data if it is determined that the received video data was not contour-compensated or the attenuating compensation was performed with respect to the received video data according to a result of said overhead reading step; and
   a step of reconstructing the received video data as it is without performing the compensation if it is determined that the contour emphasizing compensation was performed with respect to the received data according to the result of said overhead reading.

13. The method of claim 7, wherein overhead information indicating a content on compensation of the video signal is generated during the video signal compensation and embedded into a compressed video data bitstream.

14. The method of claim 13, wherein said overhead information indicates whether or not contour compensation of the image was performed and which of emphasizing and attenuating compensations was performed when the contour compensation was performed.

15. The method of claim 7, wherein said color signal processing operation further includes a hue/gain control step of controlling sizes and phases of color components of the attenuated color signal (Cb, Cr).

16. The method of claim 11, wherein said luminance signal processing operation further comprises:
- a data coring step of removing data of a low level from the low luminance compensated video signal based upon low illumination/high luminance; and
- a gamma compensation step of transforming the data from which the low level data is removed so as to make the data comport with display characteristics and providing luminance signal (Y) data.

17. The method of claim 12, wherein said luminance signal processing operation further comprises:
- a data coring step of removing data of a low level from the low luminance compensated video signal based upon low illumination/high luminance; and
- a gamma compensation step of transforming the data from which the low level data is removed so as to make the data comport with display characteristics and providing luminance signal (Y) data.

18. A video coding method for an image communication system, the method comprising the steps of:
- setting, as a limit condition of image communication, a maximum data size ($Max_{13}$ Data) per frame in accordance with a video transmission rate and a reference compression ratio available;
- compressing a present image and comparing a data size of the compressed video data with the set maximum data size;
- performing compression changing the compression ratio of a source image until the size of the present compressed video data is smaller than the set maximum data size if the size of the present compressed video data is larger than the maximum data size;
- comparing a present compression ratio of the compressed image with the set reference compression ratio if the data size of the present compressed image is smaller than the maximum data size;
- compensating the present image to lower its complexity and repeating the above steps starting from the compression step if the present compression ratio is larger than the reference compression ratio; and
- transmitting the present compressed image if the present compression ratio is smaller than the reference compression ratio,
- wherein the present image is compensated by a color signal processing operation including,
  - a color clamp compensation step of compensating a level of the color signal;
  - an automatic white balance control step of automatically controlling RGB components of the compensated color signal;
  - a color gamma transformation step of replacing data to make the RGB controlled video signal comport with color brightness of a display device; and
  - a chroma suppress compensation step of decreasing a size of the replaced color data depending on a size of luminance contour and a low illumination.

19. The method of claim 18, wherein the color signal processing operation further includes a hue/gain control step of controlling sizes and phases of color components of the attenuated color signal (Cb, Cr).

20. A video decoding method for an image communication system, the method comprising:
- an overhead reading step of detecting from a received data bitstream, information indicating whether or not contour compensation was performed and which of emphasizing and attenuating compensations was performed, wherein the compensations include a color signal processing operation including,
  - a color clamp compensation step of compensating a level of the color signal;
  - an automatic white balance control step of automatically controlling RGB components of the compensated color signal;
  - a color gamma transformation step of replacing data to make the RGB controlled video signal comport with color brightness of a display device; and
  - a chroma suppress compensation step of decreasing a size of the replaced color data depending on a size of luminance contour and a low illumination;
- a contour compensation step of performing the contour compensation with respect to the received video data if it is determined that the received video data was not contour-compensated or the attenuating compensation was performed with respect to the received video data according to a result of said overhead reading step; and
- a step of reconstructing the received video data as it is without performing the compensation if it is determined that the contour emphasizing compensation was performed with respect to the received data according to the result of said overhead reading.

21. The method of claim 20, wherein the color signal processing operation further includes a hue/gain control step of controlling sizes and phases of color components of the attenuated color signal (Cb, Cr).

* * * * *